United States Patent
Gokam et al.

(10) Patent No.: US 11,157,203 B2
(45) Date of Patent: Oct. 26, 2021

(54) ADAPTIVE LOAD BALANCING IN STORAGE SYSTEM HAVING MULTIPLE INPUT-OUTPUT SUBMISSION QUEUES

(71) Applicant: EMC IP Holding Company LLC, Hopkinton, MA (US)

(72) Inventors: Kurumurthy Gokam, Bangalore (IN); Venkatesh Doddamane Nagaraj, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 203 days.

(21) Appl. No.: 16/412,621

(22) Filed: May 15, 2019

(65) Prior Publication Data

US 2020/0363985 A1 Nov. 19, 2020

(51) Int. Cl.
*G06F 3/06* (2006.01)
*G06F 13/40* (2006.01)
*G06F 13/16* (2006.01)

(52) U.S. Cl.
CPC ............ *G06F 3/0659* (2013.01); *G06F 3/061* (2013.01); *G06F 3/067* (2013.01); *G06F 3/0611* (2013.01); *G06F 3/0613* (2013.01); *G06F 3/0635* (2013.01); *G06F 3/0653* (2013.01); *G06F 13/1668* (2013.01); *G06F 13/4072* (2013.01)

(58) Field of Classification Search
CPC .... G06F 3/0659; G06F 3/0611; G06F 3/0653; G06F 3/067; G06F 13/1668; G06F 13/4072
See application file for complete search history.

(56) References Cited

U.S. PATENT DOCUMENTS

| 6,687,746 B1 | 2/2004 | Shuster et al. |
| 6,697,875 B1 | 2/2004 | Wilson |
| 7,454,437 B1 | 11/2008 | Lavallee et al. |
| 7,770,053 B1 | 8/2010 | Bappe et al. |

(Continued)

OTHER PUBLICATIONS

Analyzing, Modeling, and Provisioning QoS for NVMe SSDs by Gugnani (Year: 2018).*

(Continued)

*Primary Examiner* — Paul M Knight
(74) *Attorney, Agent, or Firm* — Ryan, Mason & Lewis, LLP

(57) ABSTRACT

An apparatus comprises a host device configured to communicate over a network with a storage system. The host device comprises a plurality of communication adapters, each of which comprises a corresponding plurality of input-output (IO) submission queues, and a multi-path input-output (MPIO) driver configured to obtain an IO operation that targets a given logical volume of the storage system and to identify a plurality of paths between the host device and the given logical volume. Each identified path comprises a communication adapter and a corresponding IO submission queue of that communication adapter. An IO load weight and a queue depth weight are determined for each identified path. An adaptive weight for each identified path is determined as a function of the determined IO load weight and the determined queue depth weight for that identified path and a target path is selected from the identified paths based at least in part on the determined adaptive weights.

20 Claims, 3 Drawing Sheets

(56) References Cited

U.S. PATENT DOCUMENTS

| | | | |
|---|---|---|---|
| 7,809,912 B1 | 10/2010 | Raizen et al. | |
| 7,818,428 B1 | 10/2010 | Lavallee et al. | |
| 7,904,681 B1 | 3/2011 | Bappe et al. | |
| 7,925,872 B2 | 4/2011 | Lai et al. | |
| 8,281,033 B1* | 10/2012 | Riordan | G06F 3/0635 |
| | | | 709/238 |
| 9,400,611 B1 | 7/2016 | Raizen | |
| 9,529,759 B1* | 12/2016 | Hart | G06F 13/4234 |
| 9,594,780 B1 | 3/2017 | Esposito et al. | |
| 9,778,852 B1 | 10/2017 | Marshak et al. | |
| 9,804,783 B1* | 10/2017 | Bao | G06F 3/0659 |
| 10,387,078 B1* | 8/2019 | Benisty | G06F 3/0679 |
| 10,692,519 B1* | 6/2020 | McGrath | G06F 1/3221 |
| 10,884,666 B1* | 1/2021 | Karr | G06F 3/067 |
| 2004/0010563 A1 | 1/2004 | Forte et al. | |
| 2005/0100035 A1* | 5/2005 | Chiou | H04L 45/24 |
| | | | 370/412 |
| 2008/0043973 A1 | 2/2008 | Lai et al. | |
| 2011/0197027 A1 | 8/2011 | Balasubramanian et al. | |
| 2016/0117113 A1 | 4/2016 | Li et al. | |
| 2018/0234290 A1* | 8/2018 | Domrow | G06F 3/0635 |

OTHER PUBLICATIONS

Enabling NVMe WRR support in Linux Block Layer by Joshi (Year: 2017).*

NVM Express Explained White Paper (Year: 2013).*

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828 filed in the name of Sanjib Mallick et al. Dec. 21, 2017 and entitled "Storage System with Input-Output Performance Control Utilizing Application Process Detection."

* cited by examiner

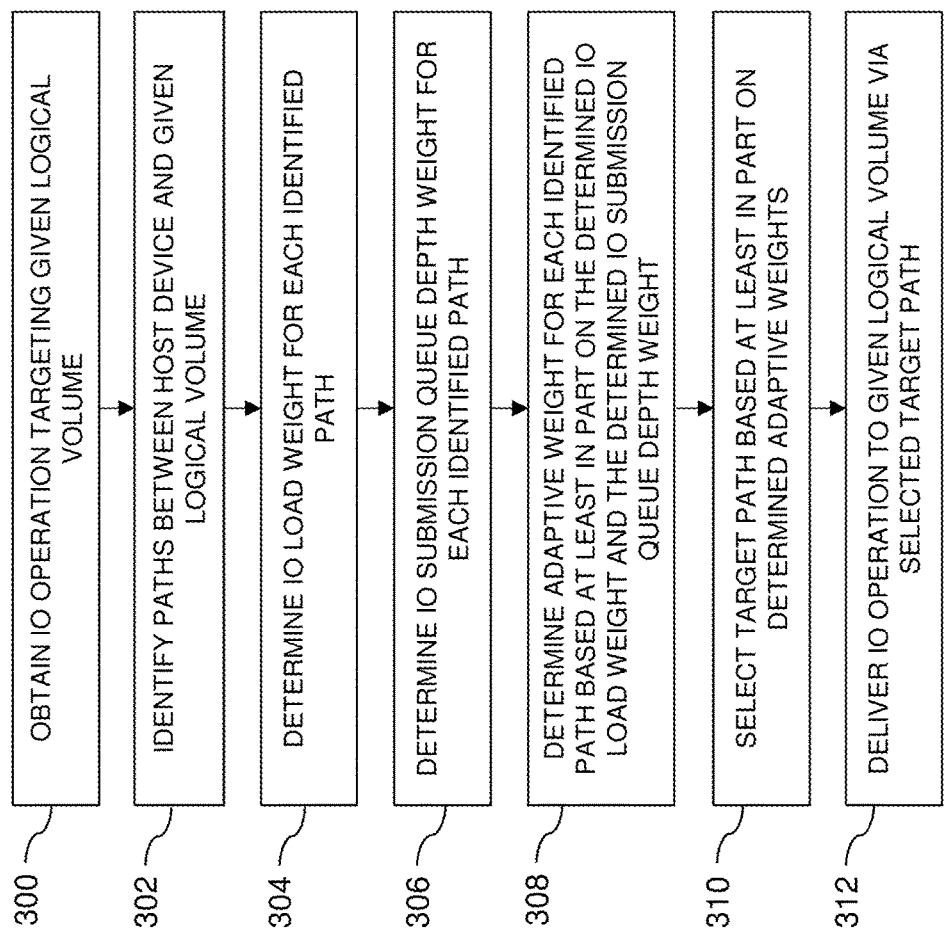

ADAPTIVE LOAD BALANCING IN STORAGE SYSTEM HAVING MULTIPLE INPUT-OUTPUT SUBMISSION QUEUES

FIELD

The field relates generally to information processing systems, and more particularly to storage in information processing systems.

BACKGROUND

Storage arrays and other types of storage systems are often shared by multiple host devices over a network. A given host device may comprise a multi-path input-output (MPIO) driver that is configured to process input-output (IO) operations for delivery from the given host device to the storage system. In some cases, the host devices may implement a non-volatile memory express (NVMe) architecture in which NVMe hardware bus adapters (HBAs) of the host device have multiple IO submission queues. Utilizing existing multi-pathing techniques with host devices implementing an NVME architecture may result in various inefficiencies in the storage system.

SUMMARY

In one embodiment, an apparatus comprises a host device configured to communicate over a network with a storage system comprising a plurality of storage devices. The host device comprises at least one processing device and a plurality of communication adapters. Each communication adapter comprises a plurality of IO submission queues. The host device further comprises an MPIO driver that is configured to deliver IO operations from the host device to the storage system over the network. The MPIO driver is further configured to obtain an IO operation that targets a given logical volume of the storage system and to identify a plurality of paths between the host device and the given logical volume. Each identified path comprises a corresponding communication adapter of the plurality of communication adapters and a corresponding IO submission queue of the plurality of IO submission queues of that corresponding communication adapter. The MPIO driver is further configured to determine an IO load weight for each identified path based at least in part on IO operations that are being dispatched on the corresponding communication adapter of that identified path and to determine a queue depth weight for each identified path based at least in part on IO operations that are pending in the corresponding IO submission queue of that identified path. The host device is further configured to determine an adaptive weight for each identified path as a function of the determined IO load weight and the determined queue depth weight for that identified path and to select a target path from the identified paths based at least in part on the determined adaptive weight for each identified path. The host device is further configured to deliver the obtained IO operation to the given logical volume via the selected target path.

These and other illustrative embodiments include, without limitation, apparatus, systems, methods and computer program products comprising processor-readable storage media.

BRIEF DESCRIPTION OF THE DRAWINGS

FIG. 3 is a flow diagram of an example process for adaptive load balancing in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
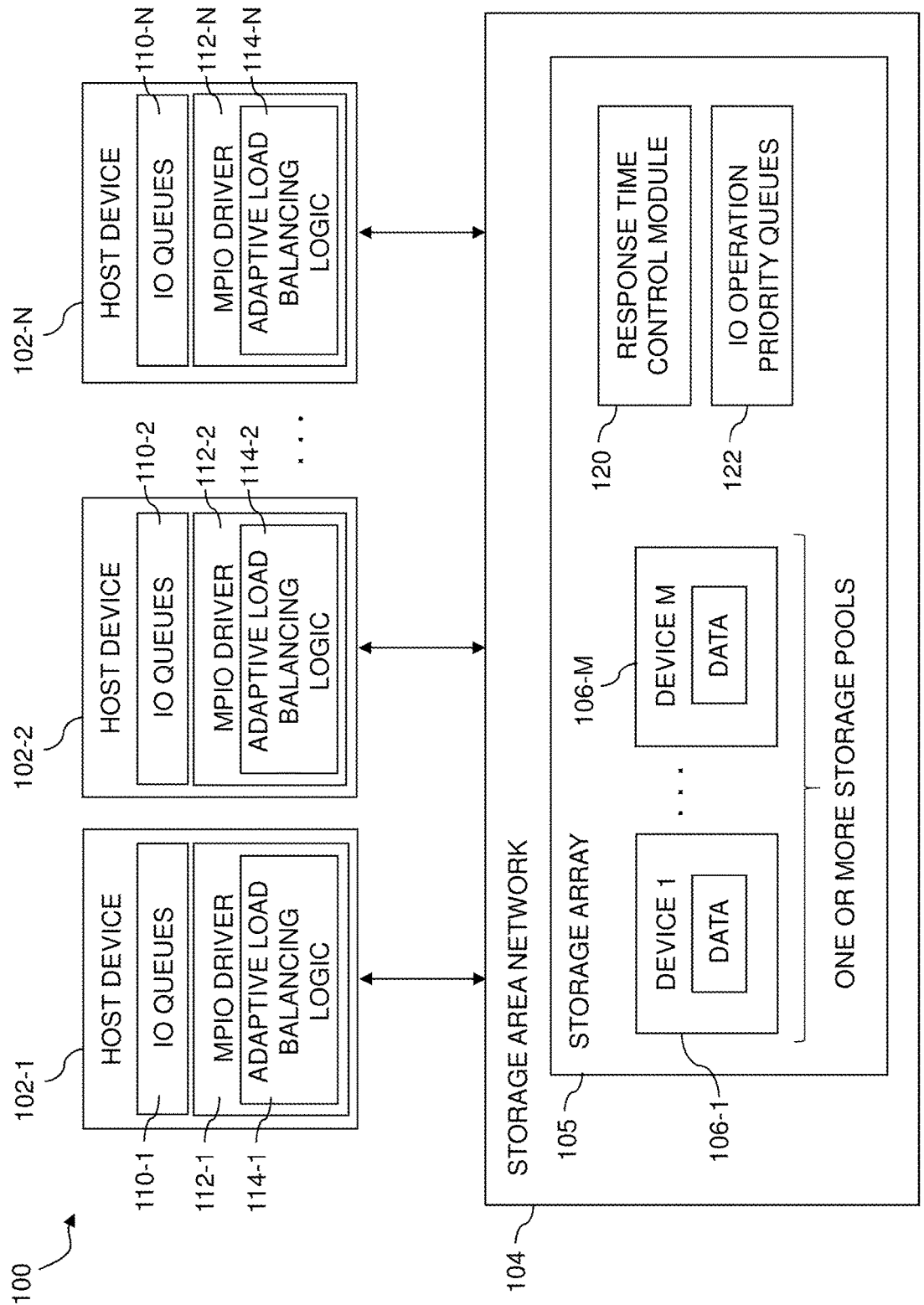
FIG. 1 is a block diagram of an information processing system configured with functionality for adaptive load balancing in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 is an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical units or volumes (LUNs) configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise small computer system interface (SCSI) commands or non-volatile memory express (NVMe) commands, depending on the type of storage device, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for adaptive load balancing logic 114-1, 114-2, . . . 114-N implemented within the MPIO drivers 112.

Figure 2:
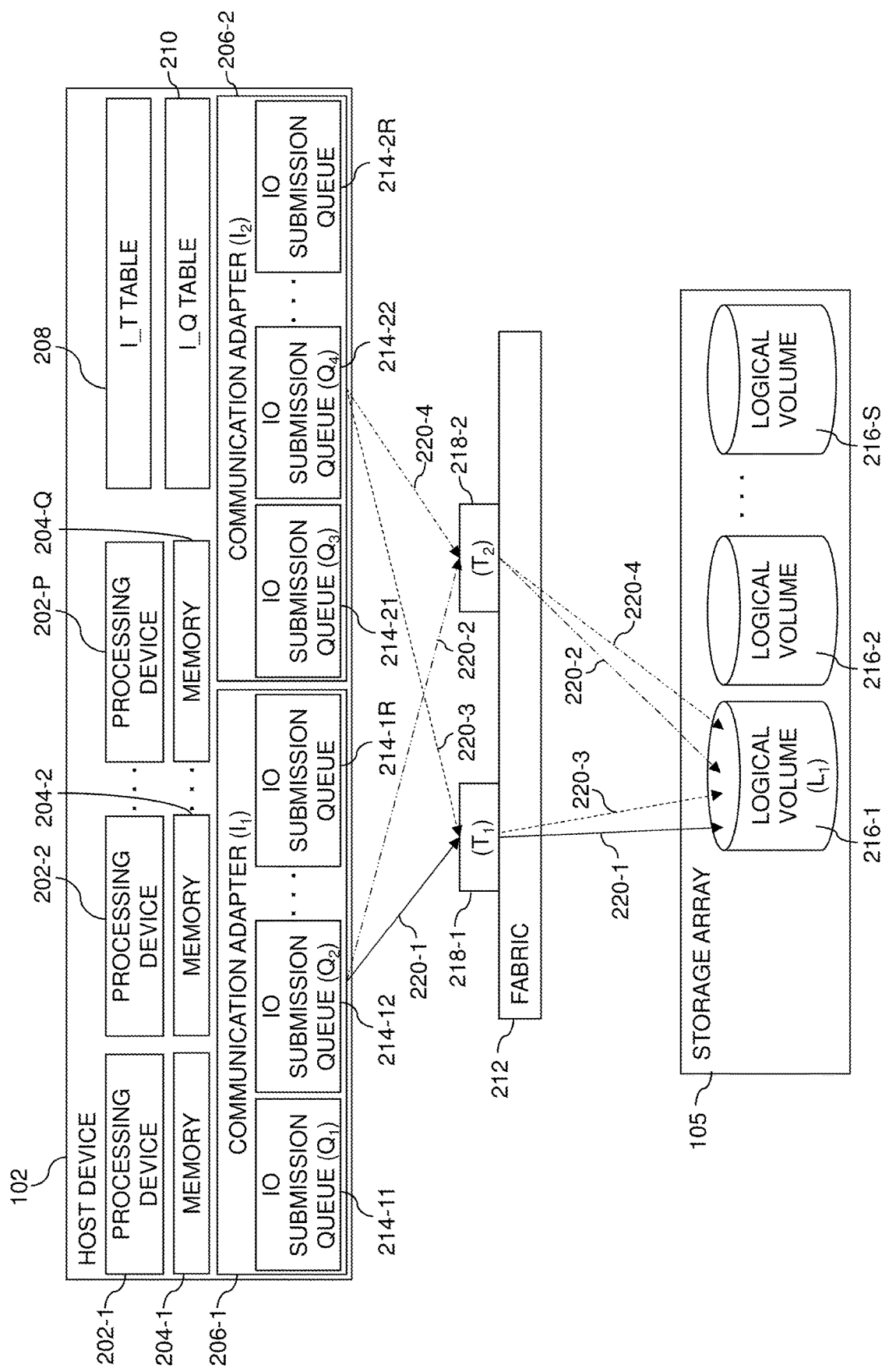
FIG. 2 is a block diagram illustrating an example implementation of a host device in the information processing system of FIG. 1 in an illustrative embodiment.

With reference now to FIG. 2, an example host device 102 illustratively comprises a plurality of processing devices 202, e.g., processing devices 202-1, 202-2 . . . 202-P, memory 204, e.g., memory 204-1, 204-2 . . . 204-Q, one or more communication adapters 206, e.g., communication adapters 206-1 and 206-2 in this example, an initiator-target (I_T) table 208 and an initiator-queue (I_Q) table 210.

While the host device 102 in the example embodiment shown in FIG. 2 is illustrated as having two communication adapters 206, a given host device 102 in alternative embodiments may have any other number of communication adapters 206. In illustrative embodiments, each communication adapter 206 implements the NVMe architecture for communicating with the storage array 105 using NVMe communication protocols. In some embodiments, the host device 102 may also comprise one or more communication adapters 206 that implement an SCSI architecture for communicating with the storage array 105 using SCSI communication protocols.

The processing devices 202 may comprise microprocessors, microcontrollers, application-specific integrated circuits (ASICs), field-programmable gate arrays (FPGAs), graphics processing units (GPUs) or other type of processing circuitry, as well as portions or combinations of such circuitry elements.

The memory 204 may comprise random access memory (RAM), read-only memory (ROM), flash memory or other types of memory, in any combination.

The communication adapters 206 may comprise, for example, HBAs or any other communication or network adapter that may be used to connect to a network such as, e.g., network fabric 212, and allow communication between host device 102 and storage array 105 via the network fabric 212. In the example host device 102 of FIG. 2, the communication adapters 206 implement an NVMe architecture. For example, an NVMe communication adapter 206 can have multiple hardware IO submission queues depending on the HBA vendor. As an example, an NVMe over fabric (NVMeOF) capable HBA can have up to 64 k IO submission queues and 64 k IO completion queues. Other numbers of IO submission queues and completion queues may be present in other embodiments.

In illustrative embodiments, for example, communication adapter 206-1 comprises IO submission queues 214-11, 214-12 . . . 214-1R and communication adapter 206-2 comprises IO submission queues 214-21, 214-22 . . . 214-2R. In some embodiments communication adapter 206-1 may comprise the same number of IO submission queues 214 as communication adapter 206-1, e.g., 64 k IO submission queues as mentioned above for an NVMeOF HBA. In some embodiments, communication adapter 206-1 may comprise a different number of IO submission queues 214 than communication adapter 206-2. For example, communication adapter 206-1 may be a different model or brand than communication adapter 206-2 that has a different number of IO submission queues. While described as having two communication adapters 206 in illustrative embodiments, host device 102 may comprise any other number of communication adapters 206. In illustrative embodiments, the communication adapters 206 are connected to network fabric 212, for example via ports or other network interfaces such as, e.g., a PCI slot.

Each IO submission queue 214 may have a different priority class and queue depth. For example, in illustrative embodiments, a given IO submission queue 214 may have a priority class according to Table 1, shown below, where each priority class has a value, e.g., 00b, 01b, 10b, or 11b, and a corresponding definition, e.g., Urgent, High, Medium, or Low. Other values or definitions may also or alternatively be used for the priority class of the IO submission queues 214.

TABLE 1

| Value | Definition |
|-------|------------|
| 00b   | Urgent     |
| 01b   | High       |
| 10b   | Medium     |
| 11b   | Low        |

In illustrative embodiments, the queue depth of a given IO submission queue 214 may be specified, for example, based at least in part on a specification of the corresponding communication adapter 206, by a user, or in any other manner. For example, in some embodiments, the specification of a corresponding communication adapter 206 may define a maximum size limit for the queue depth of each IO submission queue 214 and the queue depth for a given IO submission queue 214 may be set to a value equal to or less than the maximum size limit defined for that communication adapter 206. For example, the queue depth for the IO submission queues 214 of a given communication adapter 206 may be set upon initialization of the given communication adapter 206.

In illustrative embodiments, the number of IO operations pending in a given IO submission queue 214 may be tracked, for example, by the host device 102 or the MPIO driver 102. Each pending IO operation may be assigned a weight, also referred to herein as a "pending operation weight." For example, the weight assigned to each pending IO operation may be based at least in part on a load that that IO operation can cause on the system when dispatched from the IO submission queue to the communication adapter 206 for delivery to a target logical volume. For example, in some embodiments, the weight may be determined based at least in part on various parameters associated with the IO operation including, e.g., a type of the IO operation, a size of the IO operation, or any other parameter. For example, in some embodiments, IO operations having a larger size may have a larger weight. In some embodiments, write IO operations may have a larger weight than read IO operations where, for example, the burden on the system in processing and delivering a write IO operation is greater than the burden on the system in processing and delivering a read IO operation. In some embodiments, the weight of each IO operation may be stored, for example, in a data structure or in memory on the host device 102.

In some embodiments, for example, the weight of a given IO operation may be determined according to equation (1) below:

$$WtIO = <TypeCoeff>*<TypeIO> + <SizeCoeff>*<SizeIO> \quad (1)$$

Where:

WtIO represents where weight of a given IO operation;

TypeCoeff represents a coefficient for IO type, e.g., the portion of the weight of the given IO operation that is attributed to the type of the IO operation;

TypeIO represents the value assigned to the type of the IO operation, e.g., a read IO operation has a smaller TypeIO value than a write IO operation as mentioned above;

SizeCoeff represents a coefficient for IO size, e.g., the portion of the weight of the given IO operation that is attributed to the size of the IO operation; and SizeIO represents the value assigned to the size of the IO operation, e.g., as the size of the IO operation increases, the value of SizeIO also increases, as mentioned above.

As an example, the TypeIO for a read IO operation is generally much smaller than the TypeIO of a write IO operation since a read IO operation is cached at various levels in the SAN 104 and for most media a read IO operation takes less time than a write IO operation for the actual physical operation of reading the data from the media. In some embodiments, the TypeIO values for read IO operations and write IO operations may be assigned to predetermined values. For example, the TypeIO for read IO operations may be assigned to a first value, e.g., 5, and the TypeIO for write IO operations may be assigned to a second value, e.g., 10. Any other values may be used. In some embodiments, the values for the TypeIO for each type of operation may be set upon initialization of the MPIO driver 112. In some embodiments the values for the TypeIO for each type of operation may also or alternatively be modifiable or adjustable, for example, by a user of a host device, by an application, by a system administrator, or in any other manner.

In some embodiments, TypeCoeff and SizeCoeff may be predetermined or adjustable in a similar manner to TypeIO. For example, depending on the relative impact of type and size of a given IO operation on the performance of the system, the TypeCoeff and SizeCoeff may be adjusted. In some embodiments, for example, a sum of the TypeCoeff and SizeCoeff may add up to one.

In some embodiments, the SizeIO may, for example be determined based on a size of a given IO operation. For example, in some embodiments, an IO operation having a larger size will have a larger SizeIO value. In some embodiments the value of SizeIO is the size of the given IO operation. In some embodiments, the size of a given IO operation may be normalized into a particular range of values.

In illustrative embodiments, a dynamic IO submission queue depth weight may be determined for each IO submission queue 214. For example, the dynamic IO submission queue depth weight for each IO submission queue 214 may be determined according to equation (2), provided below.

$$\text{Dynamic IO submission queue depth weight} = \text{Sum of the weights of each pending IO operation} * \text{Number of IO operations currently dispatched on the submission queue} \quad (2)$$

In an example scenario, for example, an IO submission queue 214 may comprise four pending IO operations. A weight each of the IO operations may be determined, for example, based at least in part on the sizes and the types of the IO operation or on any other parameters of the IO operations, as described above, with reference also to equation (1). For example, if the first IO operation may have a weight of 5, the second IO operation may have a weight of 3, the third IO operation may have a weight of 7, and the fourth IO operation may have a weight of 10. In this example scenario, the sum of the weights of each pending IO operation is 25 (5+3+7+10) and the number of pending IO operations is four. The dynamic submission queue depth weight for the example IO submission queue 214 is then calculated according to equation (2) to be 100 (25*4).

In illustrative embodiments, the dynamic submission queue depth weight for each IO submission queue 214 may be stored, for example, in the I_Q table 210 of the host device 102. While described as a table, I_Q table 210 may alternatively be any other type of data structure that may be used to store information. Each entry in the I_Q table 210 corresponds to a communication adapter 206 (initiator) and a corresponding IO submission queue 214 (queue) and stores the dynamic IO submission queue depth weight for that IO submission queue. In illustrative embodiments, the dynamic IO submission queue depth weight for each IO submission queue 214 may be calculated and stored in I_Q table 210 periodically, continuously, or responsive to an action or command issued by the host device 102 or MPIO driver 112. An example I_Q table 210 is provided below as Table 2.

TABLE 2

| I_Q | Dynamic IO submission queue depth weight |
|---|---|
| $I_1Q_1$ | 20 |
| $I_1Q_2$ | 32 |
| $I_2Q_3$ | 30 |
| $I_2Q_4$ | 16 |

As can be seen in the example I_Q table shown above in Table 2, communication adapters 206-1 ($I_1$) and 206-2 ($I_2$) each have two corresponding IO submission queues 214 ($Q_1$, $Q_2$ and $Q_3$, $Q_4$, respectively). While only two IO submission queues 214 are illustrated in Table 2 for each communication adapter 206, any other number of IO submission queues 214 may be present. For example, communication adapter 206-1 ($I_1$) may have corresponding IO submission queues 214-11, 214-12 . . . 214-1R and communication adapter 206-2 ($I_2$) may have corresponding IO submission queues 214-21, 214-22 . . . 214-2R, as shown in FIG. 2. In the example shown in Table 2, for example, IO submission queue Q1 corresponds to IO submission queue 214-11 of FIG. 2, IO submission queue Q2 corresponds to IO submission queue 214-12 of FIG. 2, IO submission queue Q3 corresponds to IO submission queue 214-21 of FIG. 2 and IO submission queue Q4 corresponds to IO submission queue 214-22 of FIG. 2.

Entry $I_1Q_1$ corresponds to communication adapter 206-1 ($I_1$) and IO submission queue 214-11 ($Q_1$) and has a dynamic IO submission queue depth weight of 20. Entry $I_1Q_2$ corresponds to communication adapter 206-1 ($I_1$) and IO submission queue 214-12 ($Q_2$) and has a dynamic IO submission queue depth weight of 32. Entry $I_2Q_3$ corresponds to communication adapter 206-2 ($I_2$) and IO submission queue 214-21 ($Q_3$) and has a dynamic IO submission queue depth weight of 30. Entry $I_2Q_4$ corresponds to communication adapter 206-2 ($I_2$) and IO submission queue 214-22 ($Q_4$) and has a dynamic IO submission queue depth weight of 16.

MPIO drivers typically group all paths from a host device to a logical volume into a single logical device known as a multi-path logical device. The individual block devices representing each path are known as native devices. Applications use a multi-path logical device for IO operations so that the IO operations may be distributed across all available paths. When paths fail, the MPIO driver will typically redirect the IO operations to other alive paths in the multi-path logical device.

In an illustrative embodiment, for example as seen in FIG. 2, storage array 105 comprises a plurality of logical volumes 216-1, 216-2, . . . 216-S, e.g., residing on storage devices 106-1 . . . 106-M (FIG. 1). The host device 102 communicates with a given logical volume 216 via one or more paths each comprising an IO submission queue 214 and communication adapter 206 of the host device and a portion 218, e.g., network infrastructure, ports, etc., of the network fabric 212. In some embodiments, each path may also comprise a logical volume 216 that is the destination of the path.

In some embodiments, a communication adapter 206 and corresponding IO submission queue 214 of a path may together be referred to as an initiator-queue (I_Q) nexus for a path, where I represents an initiator (e.g., communication adapter 206) and Q represents a queue (e.g., the IO submission queue 214) for the path. In some embodiments, an I_Q nexus may also be referred to as an I_Q pair. As described above, a dynamic IO submission queue depth weight for each I_Q nexus is stored in the I_Q table 210.

In some embodiments, a communication adapter 206 and corresponding portion 218 of network fabric 212 may together may be referred to as an initiator-target (I_T) nexus for a path, where I represents an initiator (e.g., communication adapter 206) and T represents a target (e.g., the portion 218 of the network fabric 212) for the path. In some embodiments, an I_T nexus may also be referred to as an I_T pair.

In illustrative embodiments, an IO load weight may be determined for each I_T nexus. For example, the IO load weight for a given I_T nexus may be determined based at least in part on the weights of each IO operation currently being dispatched on the given I_T nexus. For example, in some embodiments, the IO load weight for a given I_T nexus may be determined based at least in part on a sum of the weights of each IO operation currently being dispatched on the given I_T nexus.

In some embodiments, for example, the weight each of the IO operations currently being dispatched on the given I_T nexus, also referred to herein as a "dispatched operation weight," may be determined in a similar manner to that described above for the weights of the IO operations pending on the IO submission queues 214. For example, in some embodiments, the weight of a given IO operation may be determined based at least in part on various parameters associated with the IO operation including, e.g., a type of the IO operation, a size of the IO operation, or any other parameter. For example, in some embodiments, IO operations having a larger size may have a larger weight. In some embodiments, write IO operations may have a larger weight than read IO operations where, for example, the burden on the system in processing and delivering a write IO operation is greater than the burden on the system in processing and delivering a read IO operation. In some embodiments, the weight of each IO operation may be stored, for example, in a data structure or in memory on the host device 102.

In illustrative embodiments, the IO load weight for each I_T nexus may be stored in I_T table 208. In some embodiments, the IO load weight for each I_T nexus may be calculated and stored in I_T table 208 periodically, continuously, or responsive to an action or command issued by the host device 102 or MPIO driver 112. An example I_T table 208 is provided below as Table 3.

TABLE 3

| I_T | IO load weight |
|---|---|
| $I_1T_1$ | 35 |
| $I_1T_2$ | 27 |
| $I_2T_1$ | 42 |
| $I_2T_2$ | 12 |

As can be seen in the example I_T table shown above in Table 3, there are two communication adapters 206 ($I_1$, $I_2$) and two portions 218 ($T_1$, $T_2$) of network fabric 212. Entry $I_1T_1$ corresponds to a first I_T nexus comprising communication adapter 206-1 ($I_1$) and portion 218-1 ($T_1$) of network fabric 212 and has an IO load weight of 35. Entry $I_1T_2$ corresponds to a second I_T nexus comprising communication adapter 206-1 ($I_1$) and portion 218-2 ($T_2$) of network fabric 212 and has an IO load weight of 27. Entry $I_2T_1$ corresponds to a third I_T nexus comprising communication adapter 206-2 ($I_2$) and portion 218-1 ($T_1$) of the network fabric 212 and has an IO load weight of 42. Entry $I_2T_2$ corresponds to a fourth I_T nexus comprising communication adapter 206-2 ($I_2$) and portion 218-2 ($T_2$) of the network fabric 212 and has an IO load weight of 12.

As described above, each path may comprise a queue (e.g., IO submission queue 214), an initiator (e.g., communication adapter 206), a target (e.g., portion 218 of network fabric 212), and a logical volume (e.g., logical volume 216). In some embodiments, the initiator, target, and logical volume may together be referred to as an initiator-target-logical volume (I_T_L) nexus. In some embodiments, an I_T_L nexus may also be referred to as an I_T_L triad.

As illustrated in FIG. 2, for example, communication adapter 206-1 (designated as $I_1$) may communicate with a target logical volume 216-1 (designated as $L_1$) via portion 218-1 (designated as $T_1$) of network fabric 212 forming an I_T_L nexus 220-1 ($I_1T_1L_1$). Communication adapter 206-1 ($I_1$) may also communicate with logical volume 216-1 ($L_1$) via portion 218-2 (designated as $T_2$) of network fabric 212 forming a I_T_L nexus 220-2 ($I_1T_2L_1$). Communication adapter 206-2 (designated as $I_2$) may communicate with logical volume 216-1 ($L_1$) via portion 218-1 ($T_1$) of network fabric 212 forming a I_T_L nexus 220-3 ($I_2T_1L_1$). Communication adapter 206-2 ($I_2$) may also communicate with logical volume 216-1 ($L_1$) via portion 218-2 ($T_2$) of network fabric 212 forming a I_T_L nexus 220-4 ($I_2T_2L_1$). Thus, in the example of FIG. 2, there are I_T_L nexuses, 220-1 ($I_1T_1L_1$), 220-2 ($I_1T_2L_1$), 220-3 ($I_2T_1L_1$) and 220-4 ($I_2T_2L_1$), between the communication adapters 206 of the host device 102 and the target logical volume 216-1, two for each of communication adapters 206-1 and 206-2. Any other number of I_T_L nexuses may also be present, for example, if there are additional communication adapters 206, portions 218 or both present in the host device 102.

In illustrative embodiments, each I_T_L nexus 220 may be utilized for dispatching IO operations from the IO submission queues 214 of their respective communication adapters 206 to the logical volume 216-1. For example, I_T_L nexuses 220-1 and 220-2 may be utilized to dispatch IO operations that are pending in the IO submission queues 214-11, 214-12 . . . 214-1R corresponding to communication adapter 206-1 while I_T_L nexuses 220-3 and 220-4 may be utilized to dispatch IO operations that are pending in the IO submission queues 214-21, 214-22 . . . 214-2R corresponding to communication adapter 206-2.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In some embodiments, paths are added or deleted in conjunction with the addition of a new communication adaptor or the removal of an existing communication adaptor from the host device.

In these and other situations, path discovery scans may be performed by the MPIO drivers of the multi-path layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO drivers described herein may comprise, for example, otherwise conventional MPIO drivers, such as PowerPath® drivers from Dell EMC of Hopkinton, Mass., suitably modified in the manner disclosed herein to implement functionality for adaptive load balancing. Other types of MPIO drivers from other driver vendors may be suitably modified to incorporate functionality for adaptive load balancing as disclosed herein.

The storage array 105 in the present embodiment is assumed to comprise a persistent memory that is implemented using a flash memory or other types of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, now issued as U.S. Pat. No. 10,474,367, filed Dec. 21, 2017, and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to support node adaptive load balancing of IO operations as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

In IO load balancing, the weight for a given path is often determination based on the IO load of the corresponding I_T nexus. However, such a determination may result in an inefficient use of the storage system. For example, because NVMe-based architectures comprise communication adapters that have multiple IO submission queues, the weight of the I_T nexuses for that communication adapter do not, on their own, represent the full utilization of that communication adapter.

In illustrative embodiments, the MPIO drivers 112 provide functionality for adaptive load balancing of IO operations from the host device 102 to the storage array 105 using respective adaptive load balancing logic 114 implemented within the MPIO drivers 112. Adaptive load balancing logic 114 improves the IO load balancing algorithm described above by considering the dynamic IO submission queue depth weight and in some embodiments the IO submission queue priority class of each individual NVMe IO submission queue for each communication adapter.

In illustrative embodiments, for example, the adaptive weight of a given path may be determined based on equation (4), below.

$$F(\text{adaptive weight}) = <\text{IO load weight of } I\_T \text{ nexus}> + <\text{Dynamic IO submission queue depth weight of IO submission queue}> \quad (4)$$

For example, the IO load weight of the I_T nexus for a given path may be determined as described above and may be obtained from the entry in the I_T table for that I_T nexus. In addition, the dynamic IO submission queue depth weight for a given path may be determined as described above and may be obtained from the entry in the I_Q table for that IO submission queue.

As an example, with reference to Tables 2 and 3 above, a first example path comprising the I_T nexus $I_1T_1$ and the I_Q nexus $I_1Q_1$ has an IO load weight of 35 and a dynamic IO submission queue depth weight of 20. The adaptive weight of the first example path in this scenario is 55 (35+20). A second example path comprising the I_T nexus $I_1T_1$ and the I_Q nexus $I_1Q_2$ has an IO load weight of 35 and a dynamic IO submission queue depth weight of 32. The adaptive weight of the second example path in this scenario is 67 (35+32). A third example path comprising the I_T nexus $I_1T_2$ and the I_Q nexus $I_1Q_1$ has an IO load weight of 27 and a dynamic IO submission queue depth weight of 20. The adaptive weight of the example path in this scenario is 47 (27+20). A fourth example path comprising the I_T nexus $I_1T_2$ and the I_Q nexus $I_1Q_2$ has an IO load weight of 27 and a dynamic IO submission queue depth weight of 32. The adaptive weight of the fourth example path in this scenario is 59 (27+32). Adaptive weights for example paths comprising I_T nexus $I_2T_1$ and $I_2T_2$ may be similarly determined for each I_Q nexus $I_2Q_3$ and $I_2Q_4$. As an example, the path that has the lowest adaptive weight according to Tables 2 and 3 is the path that comprises I_T nexus $I_2T_2$ and I_Q nexus $I_2Q_4$ which has an adaptive weight of 28 (12+16). In illustrative embodiments, the adaptive load balancing logic 114 selects the path that has the lowest adaptive weight for processing the IO operation. Other paths may alternatively be selected based at least in part on the adaptive weight or based on any other criteria.

In an illustrative embodiment, adaptive load balancing logic 114 may first determine the best I_T nexus to use for the IO operation, for example, based at least in part on the IO load weight of each I_T nexus found in I_T table 208, followed by a determination of the best IO submission queue 214 to use for the communication adapter 206 of that I_T nexus, e.g., based at least in part on the dynamic IO submission queue depth weight found in I_Q table 210. For example, with reference again to Tables 2 and 3, adaptive load balancing logic 114 may first select I_T nexus $I_2T_2$, which has the smallest IO load weight at 12. Adaptive load balancing logic 114 may then consider only those paths which include the IO submission queues 214 that correspond to communication adapter 206-2 ($I_2$). For example, adaptive load balancing logic 114 may consider only the paths comprising I_Q nexuses $I_2Q_3$ and $I_2Q_4$ for use in processing the IO operation. In such an embodiment, the path comprising $I_2Q_4$ is selected since the I_Q nexus $I_2Q_4$ has the smallest dynamic IO submission queue depth weight at 16.

In some embodiments, the priority class of the IO submission queues 114 may be utilized by an application executing on the host device 102 or by an MPIO driver 112 to allocate IO operations according to their respective importance to the application. For example, an IO operation may have a priority value, e.g., urgent, high, medium, low or other priority values. For example, an IO write operation may have a high priority while an IO read operation may have a medium or low priority value. Any priority value may be assigned to a given IO operation. An example correspondence between the priority value of an IO operation and the priority class of the IO submission queues may be determined based at least in part on Table 4 below.

TABLE 4

| IO priority | IO submission queue priority |
| --- | --- |
| Urgent | Urgent |
| High | High |
| Medium | Medium |
| Low | Low |

As seen in Table 4, for example, an IO operation having a priority value of urgent may correspond to IO submission queues that have the urgent priority class, an IO operation having a priority value of high may correspond to IO submission queues that have the high priority class, an IO operation having a priority value of medium may correspond to IO submission queues that have the medium priority class and an IO operation having a priority value of low may correspond to IO submission queues that have the low priority class. Any other priority values may be used and may be mapped to the priority class of the IO submission queues, for example, in a data structure stored in the host device 102 or MPIO driver 112.

In illustrative embodiments, adaptive load balancing logic 114 may consider the priority value of an IO operation when selecting the path to dispatch an IO operation. For example, adaptive load balancing logic 114 may select a path for dispatching an IO operation that includes an IO submission queue 214 having the priority class corresponding to the priority value of the IO operation. In an example scenario, a given communication adapter 206 comprises five IO submission queues 214 each having a priority class, e.g., an IO submission queue Q1 having an urgent priority class, an IO submission queue Q2 having a high priority class, IO submission queues Q3 and Q4 having a medium priority class and an IO submission queue Q5 having a low priority class. In this example scenario, the priority value of an obtained IO operation may be used to filter the available paths to only those that comprise IO submission queues 214 that have a priority class corresponding to the priority value of the IO operation. For example, if an obtained IO operation has a priority value of medium, the paths comprising IO submission queues Q3 and Q4 may be considered for dispatching the IO operation. In this scenario, for example, adaptive load balancing logic 114 will select the path that has the lowest adaptive weight between the paths comprising IO submission queues Q3 and Q4.

In some embodiments, the path that has the lowest adaptive weight and an IO submission queue 214 that has a priority class corresponding to at least the priority value of the IO operation may be selected by adaptive load balancing logic 114. For example, if the priority value of an obtained IO operation is medium, adaptive load balancing logic 114 may select a path that has an IO submission queue 214 of at least a medium priority class, e.g., any path that has an IO submission queue 214 having a priority class of medium, high, or urgent.

While adaptive load balancing logic 114 is described above with respect to a single host device, in some embodiments, any number of host devices may be used where, for example, a given path from a given host device 102 to a given logical volume 216 may utilize a communication adapter 206 associated with another host device 102 that is different than the given host device 102.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and adaptive load balancing logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Illustrative embodiments of the techniques and functionality of adaptive load balancing logic 114 will now be described in more detail with reference to the flow diagram of FIG. 3. FIG. 3 provides an example process that is implemented by adaptive load balancing logic 114 to select a path for delivering an IO operation to a given logical volume that takes into account both IO load weight of I_T nexuses, dynamic IO submission queue depth weight of I_Q nexuses and, in some embodiments, priority classes of the IO submission queues 214.

The process as shown in FIG. 3 includes steps 300 through 312, and is suitable for use in the system 100 but is more generally applicable to other types of systems comprising multiple host devices and a shared storage system.

At 300, the MPIO driver 112 obtains an IO operation from the IO queue 110 of its host device 102. The IO operation targets a given logical volume of the storage array 105, e.g., logical volume 216-1. For example, the IO operation may be obtained from IO queues 110.

At 302, adaptive load balancing logic 114 identifies a plurality of paths between the host device and the given logical volume via the plurality of communication adapters and their corresponding IO submission queues, for example, as described above.

At 304, adaptive load balancing logic 114 determines an IO load weight for each identified path based at least in part on IO operations that are being dispatched on the communication adapter corresponding to that identified path. For example, in some embodiments, the IO load weight may be obtained from the I_T table 208, as described above.

At 306, adaptive load balancing logic 114 determines a dynamic IO submission queue depth weight for each identified path based at least in part on IO operations that are pending in the IO submission queue 214 corresponding to that identified path. For example, in some embodiments, the dynamic IO submission queue depth weight may be obtained from the I_Q table 210, as described above.

At 308, adaptive load balancing logic 114 determines an adaptive weight for each identified path as a function of the determined IO load weight and the determined dynamic IO submission queue depth weight for that identified path. For example, in some embodiments the adaptive weight may be determined based at least in part on a product of the determined IO load weight and the determined dynamic IO submission queue depth weight.

At 310, adaptive load balancing logic 114 selects a target path from the identified paths based at least in part on the determined adaptive weight for each identified path. For example, adaptive load balancing logic 114 may select the path having the lowest adaptive weight.

At 312, adaptive load balancing logic 114 delivers the obtained IO operation to the given logical volume via the selected target path.

Separate instances of the process of FIG. 3 may be performed in respective additional host devices that share the storage array.

The particular processing operations and other system functionality described in conjunction with the flow diagram of FIG. 3 is presented by way of illustrative example only, and should not be construed as limiting the scope of the disclosure in any way. Alternative embodiments can use other types of processing operations involving host devices, storage systems and adaptive load balancing logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different adaptive load balancing logic arrangements within a given information processing system.

Functionality such as that described in conjunction with the flow diagram of FIG. 3 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for adaptive load balancing are carried out at least in part under the control of its adaptive load balancing logic 114. For example, adaptive load balancing logic 114 is illustratively configured to control performance of portions of the process shown in the flow diagram described above in conjunction with FIG. 3.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104, and to perform the disclosed functionality for adaptive load balancing. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support adaptive load balancing.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for adaptive load balancing as disclosed herein, IO load balancing in NVMe-based architectures, may be inefficient since the loads will typically be sent to any IO submission queue for a given communication adapters without determining a queue depth or priority level of the IO submission queue.

Such drawbacks are advantageously overcome in illustrative embodiments herein by utilization of adaptive load balancing logic 114 to implement functionality for adaptive load balancing as described above. For example, by selecting the target path as a function of the IO weight of the I_T nexuses and the dynamic IO submission queue depth weight of the I_Q nexuses for each path, the path having the best combination of available throughput and latency may be utilized to maximize efficiency in the system. This allows underutilized IO submission queues of a given communication adapter to be taken advantage of by the MPIO driver.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the adaptive load balancing logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, adaptive load balancing logic, sets of nodes and additional or alternative components. Also, the particular configurations of system and device elements and associated processing operations illustratively shown in the drawings can be varied in other embodiments. For example, a wide variety of different MPIO driver configurations and associated adaptive load balancing logic arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with a storage system comprising a plurality of storage devices;
the host device comprising:
at least one processing device and a plurality of communication adapters, each communication adapter comprising a plurality of input-output submission queues; and
a multi-path input-output driver configured to deliver input-output operations from the host device to the storage system over the network;
wherein the multi-path input-output driver is further configured:
to obtain an input-output operation that targets a given logical volume of the storage system;
to identify a plurality of paths between the host device and the given logical volume, each identified path comprising a corresponding communication adapter of the plurality of communication adapters and a corresponding input-output submission queue of the plurality of input-output submission queues of that corresponding communication adapter;
to determine an input-output load weight for each identified path based at least in part on input-output operations that have been dispatched from the corresponding communication adapter of that identified path to the storage system and are currently in progress;
to determine a queue depth weight for each identified path based at least in part on input-output operations that are pending in the corresponding input-output submission queue of that identified path;
to determine an adaptive weight for each identified path as a mathematical function of the determined input-output load weight and the determined queue depth weight for that identified path;
to select a target path from the identified paths based at least in part on the determined adaptive weight for each identified path; and
to deliver the obtained input-output operation to the given logical volume via the selected target path.

2. The apparatus of claim 1 wherein the input-output load weight for a given identified path is determined based at least in part on a sum of dispatched operation weights of the input-output operations that have been dispatched from the corresponding communication adapter of that identified path to the storage system and are currently in progress.

3. The apparatus of claim 2 wherein the dispatched operation weight of a given input-output operation that has been dispatched from the corresponding communication adapter of the given identified path is determined based at least in part on a type of the given input-output operation.

4. The apparatus of claim 1 wherein the queue depth weight for a given identified path is determined based at least in part on a product of a pending operation weight of each input-output operation that is pending on the corresponding input-output submission queue of the given identified path and the number of input-output operations that are pending on the corresponding input-output submission queue of the given identified path.

5. The apparatus of claim 4 wherein the pending operation weight of a given input-output operation that is pending on the corresponding input-output submission queue of the given identified path is determined based at least in part on a type of the given input-output operation.

6. The apparatus of claim 4 wherein the pending operation weight of a given input-output operation that is pending on the corresponding input-output submission queue of the given identified path is stored in a data structure, each entry in the data structure corresponding to a given communication adapter and one of the corresponding input-output submission queues of the given communication adapter.

7. The apparatus of claim 1 wherein the multi-path input-output driver is further configured to determine a priority of the obtained input-output operation;
wherein each input-output submission queue has a priority level; and
wherein identifying the plurality of paths between the host device and the given logical volume comprises identifying one or more paths that have corresponding input-output submission queues that have a priority level corresponding to the determined priority of the obtained input-output operation.

8. A method comprising:
obtaining, by a multi-path input-output driver of a host device configured to communicate over a network with a storage system comprising a plurality of storage devices, an input-output operation that targets a given logical volume of the storage system;
identifying, by the multi-path input-output driver, a plurality of paths between the host device and the given logical volume, each identified path comprising a corresponding communication adapter of a plurality of communication adapters of the host device and a corresponding input-output submission queue of a plurality of input-output submission queues of that corresponding communication adapter;
determining, by the multi-path input-output driver, an input-output load weight for each identified path based at least in part on input-output operations that have been dispatched from the corresponding communication adapter of that identified path to the storage system and are currently in progress;
determining, by the multi-path input-output driver, a queue depth weight for each identified path based at least in part on input-output operations that are pending in the corresponding input-output submission queue of that identified path;
determining, by the multi-path input-output driver, an adaptive weight for each identified path as a mathematical function of the determined input-output load weight and the determined queue depth weight for that identified path;
selecting, by the multi-path input-output driver, a target path from the identified paths based at least in part on the determined adaptive weight for each identified path;
delivering, by the multi-path input-output driver, the obtained input-output operation to the given logical volume via the selected target path; and
wherein the host device comprises a processor coupled to a memory.

9. The method of claim 8 wherein the input-output load weight for a given identified path is determined based at least in part on a sum of dispatched operation weights of the input-output operations that have been dispatched from the corresponding communication adapter of that identified path to the storage system and are currently in progress.

10. The method of claim 9 wherein the dispatched operation weight of a given input-output operation that has been dispatched from the corresponding communication adapter of the given identified path is determined based at least in part on a type of the given input-output operation.

11. The method of claim 8 wherein the queue depth weight for a given identified path is determined based at least in part on a product of a pending operation weight of each input-output operation that is pending on the corresponding input-output submission queue of the given identified path and the number of input-output operations that are pending on the corresponding input-output submission queue of the given identified path.

12. The method of claim 11 wherein the pending operation weight of a given input-output operation that is pending on the corresponding input-output submission queue of the given identified path is determined based at least in part on a type of the given input-output operation.

13. The method of claim 11 wherein the pending operation weight of a given input-output operation that is pending on the corresponding input-output submission queue of the given identified path is stored in a data structure, each entry in the data structure corresponding to a given communication adapter and one of the corresponding input-output submission queues of the given communication adapter.

14. The method of claim 8 wherein the multi-path input-output driver is further configured to determine a priority of the obtained input-output operation;
wherein each input-output submission queue has a priority level; and
wherein identifying the plurality of paths between the host device and the given logical volume comprises identifying one or more paths that have corresponding input-output submission queues that have a priority level corresponding to the determined priority of the obtained input-output operation.

15. A computer program product comprising a non-transitory processor-readable storage medium having stored therein program code of one or more software programs, wherein the program code, when executed by a host device that is configured to communicate over a network with a storage system comprising a plurality of storage devices, the host device comprising at least one processing device and a plurality of communication adapters, each communication adapter comprising a plurality of input-output submission queues, the host device further comprising a multi-path input-output driver configured to deliver input-output operations from the host device to the storage system over the network, causes the multi-path input-output driver:
to obtain an input-output operation that targets a given logical volume of the storage system;
to identify a plurality of paths between the host device and the given logical volume, each identified path comprising a corresponding communication adapter of the plurality of communication adapters and a corresponding input-output submission queue of the plurality of input-output submission queues of that corresponding communication adapter;
to determine an input-output load weight for each identified path based at least in part on input-output operations that have been dispatched from the corresponding communication adapter of that identified path to the storage system and are currently in progress;
to determine a queue depth weight for each identified path based at least in part on input-output operations that are pending in the corresponding input-output submission queue of that identified path;

to determine an adaptive weight for each identified path as a mathematical function of the determined input-output load weight and the determined queue depth weight for that identified path;

to select a target path from the identified paths based at least in part on the determined adaptive weight for each identified path; and to deliver the obtained input-output operation to the given logical volume via the selected target path.

16. The computer program product of claim 15 wherein the input-output load weight for a given identified path is determined based at least in part on a sum of dispatched operation weights of the input-output operations that have been dispatched from the corresponding communication adapter of that identified path to the storage system and are currently in progress and wherein the dispatched operation weight of a given input-output operation that has been dispatched from the corresponding communication adapter of the given identified path is determined based at least in part on a type of the given input-output operation.

17. The computer program product of claim 15 wherein the queue depth weight for a given identified path is determined based at least in part on a product of a pending operation weight of each input-output operation that is pending on the corresponding input-output submission queue of the given identified path and the number of input-output operations that are pending on the corresponding input-output submission queue of the given identified path.

18. The computer program product of claim 17 wherein the pending operation weight of a given input-output operation that is pending on the corresponding input-output submission queue of the given identified path is determined based at least in part on a type of the given input-output operation.

19. The computer program product of claim 17 wherein the pending operation weight of a given input-output operation that is pending on the corresponding input-output submission queue of the given identified path is stored in a data structure, each entry in the data structure corresponding to a given communication adapter and one of the corresponding input-output submission queues of the given communication adapter.

20. The computer program product of claim 15 wherein program code further causes the multi-path input-output driver to determine a priority of the obtained input-output operation;

wherein each input-output submission queue has a priority level; and wherein identifying the plurality of paths between the host device and the given logical volume comprises identifying one or more paths that have corresponding input-output submission queues that have a priority level corresponding to the determined priority of the obtained input-output operation.

\* \* \* \* \*